May 26, 1931.  W. ANDERSON  1,807,463

TRAP

Filed Jan. 24, 1930  2 Sheets-Sheet 1

Will Anderson, INVENTOR

BY Victor J. Evans ATTORNEY

WITNESS

May 26, 1931.　　W. ANDERSON　　1,807,463
TRAP
Filed Jan. 24, 1930　　2 Sheets-Sheet 2
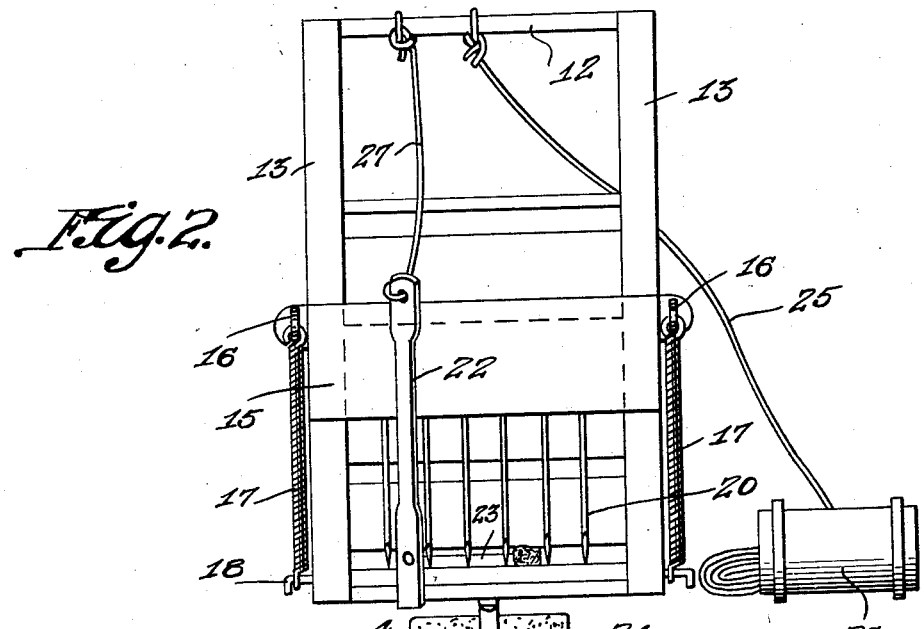
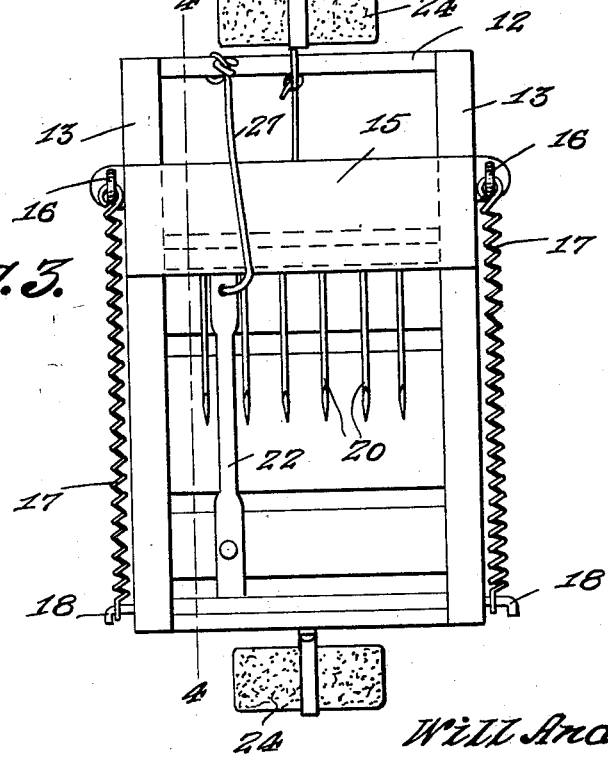
Will Anderson, INVENTOR
BY Victor J. Evans ATTORNEY Patented May 26, 1931

1,807,463

UNITED STATES PATENT OFFICE

WILL ANDERSON, OF MINNEAPOLIS, MINNESOTA

TRAP

Application filed January 24, 1930. Serial No. 423,226.

This invention relates to certain new and useful improvements in traps and more particularly to that form to be suspended in submerged position.

An object of the invention consists of a housing having a fall upon the entrance therefor.

Another object of the invention embodies a plurality of barbed holding elements for the fall whereby the lured game will be securely held.

A further object of the invention contemplates the provision and arrangement of means whereby the trap may be submerged a suitable distance below the surface of the water.

An additional object of the invention comprehends a form of trigger for the fall having the bait carrying end thereof disposed wholly within the trap whereby the game will be caught well up upon the body.

With the above and other objects in view, the invention further consists of the following novel features and details of construction, to be hereinafter more fully described, illustrated in the accompanying drawings and pointed out in the appended claim.

In the drawings:—

Figure 2 is a front elevation of the invention with the fall in released position.

Figure 3 is a view similar to Figure 2 with the fall and barbs therefor in elevated or set position.

Figure 1:
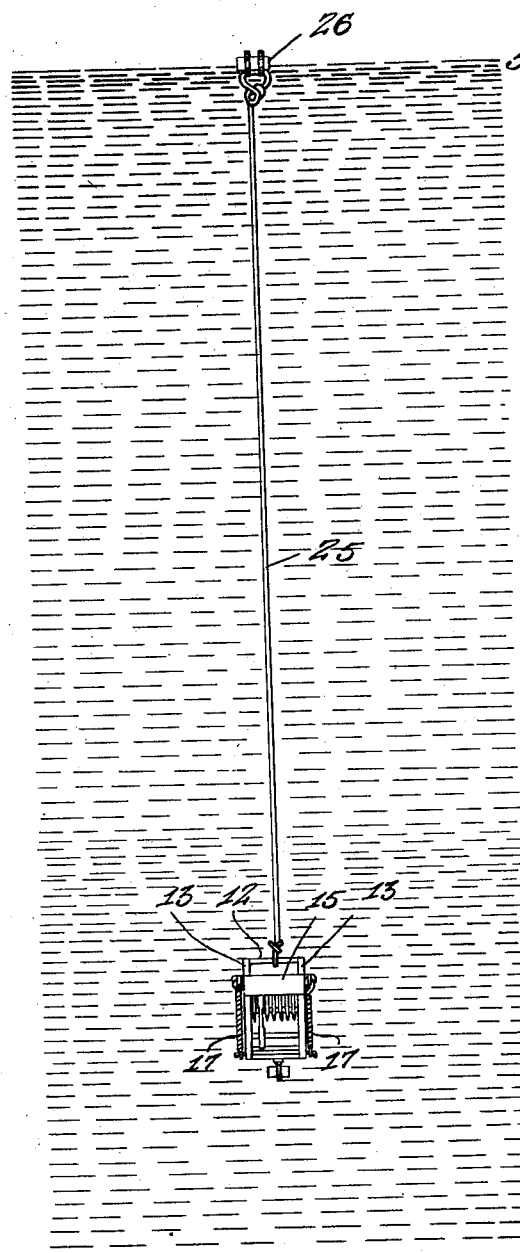
Figure 1 is an elevation of the invention set up for use.

Referring to the drawings in detail wherein like characters of reference denote corresponding parts, the reference character 10 indicates generally the housing for the trap although shown to be of box-like formation may be constructed in any size and shape in accordance with the desires of the trapper and pursuant to the type and characteristics of the game stalked. Standards, such as indicated at 11, carried by and upstanding from the top of the housing immediately adjacent the entrance end of the trap, support a horizontally disposed bridge piece 12 between the uppermost ends thereof to preserve parallel alignment.

Figure 4:
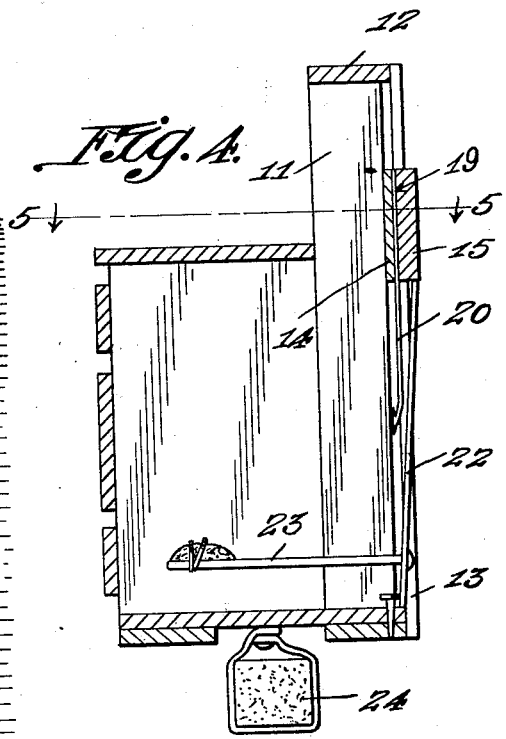
Figure 4 is a vertical sectional view taken on line 4—4 of Figure 3.

From the illustration of my invention in Figure 4 of the drawings, it is noted that the bottom wall or floor of the housing and the adjacent forward edge of the bridge piece 12 extend for appreciable distances beyond the outermost forward side edges of the standards 11. Flange members 13, having connection at their ends with the aforementioned extended portions of the housing bottom wall and the bridge piece 12, are spaced throughout the remaining portions of their lengths from the forward side edges of said standards, as substantiated in the illustration of my invention in Figure 4.

Figure 5:
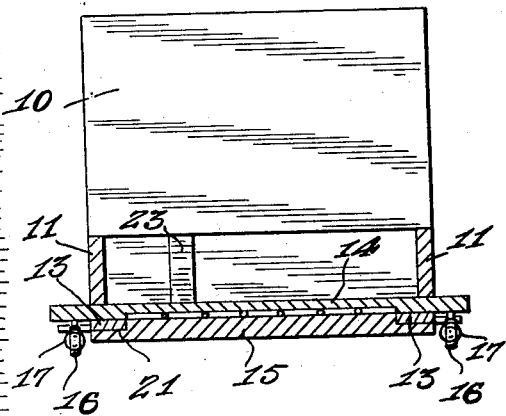
Figure 5 is a horizontal sectional view taken on line 5—5 of Figure 4.

The fall, referred to in the foregoing, is composed of multiple sections 14 and 15 respectively. The section 14 will be hereinafter referred to as the longer or innermost section and the section 15 will be designated as the outermost of the sections. The section 14 is extended between the standards 11 and the flanges 13 therefor for vertical sliding movement within the raceways or passageways defined therebetween. Screw eyes 16, forwardly projecting from the extended ends of the longer section 14, are connected with the adjacent ends of retractile springs 17 anchored, as at 18, at their opposite ends upon the outer sides of the bottom wall for the housing whereby the fall is normally induced to occupy the Figure 2 position. The outermost section 15 coacts or otherwise compensates with the innermost or longer section 14 in the retention of the shanks 19 of barbed spears or harpoons 20. The latter depend for appreciable distances below the lowermost edge of the completed fall. In the horizontal sectional view shown in Figure 5 of the drawings, the outermost of the fall sections 15 are reduced, as at 21, adjacent their ends to accommodate the flanges 13 and to dispose the greater portions of the inner face thereof against the shanks of the harpoons.

The trigger mechanism primarily resides in the provision and arrangement of an arm 22 arranged in the manner shown in Figures 1, 3 and 4 of the drawings while in use, that is, having its ends engageable with the adjacent portions of the housing bottom wall and the completed fall. A leg or bait supporting member, such as indicated at 23, carried by and inwardly projecting from the arm 22 for an appreciable distance within the housing and adjacent its lowermost end, will actuate after the manner of an eccentrically mounted fulcrum lever in the transmission of increased swing or shifting movement to the end of the trigger arm 22 extending the longer distance from the connection of the leg 23 therewith whereby slight nibbling action by the fish or animal upon the bait carried by the leg 23 will shift the uppermost end of the trigger arm 22 out of the path of movement of the fall whereby the latter will be induced to occupy the Figure 2 position incident to the connection and constant tension exercised by the springs 17. When the present invention is employed for trapping fish, same is arranged in the manner shown in Figure 1 of the drawings, that is, a weight of any suitable character, and as indicated at 24, sufficient in avoirdupois to maintain the entire trap in submerged position, is arranged upon the under side of the bottom wall therefor and a rope or cord 25 is connected with the bridge piece 12.

A float 26, having connection with the cord 25, rides upon the surface of the water and which is to be buoyant enough to support the trap and appendage therefor. That portion of the rope or cord 25 in excess to that which is employed to submerge the trap to the desired depth is extended from the float and tied to the shore or connected with a limb overhanging the water. A fish or other aquatic animal or mammal, biting and pulling at the form of bait secured upon the leg 23 within the housing 10, will release the fall and harpoons and descend upon the animal or mammal and hold it fast. The game, by being held beneath the surface of the water, will drown and its weight added to the weight of the submerged trap will be sufficient to draw the float 26 for an appreciable distance below the surface of the water whereby the trapper making the rounds of his trap lines will be able to determine at a distance and at a glance whether his efforts have been rewarded.

The uppermost end of the trigger arm 22 is connected with the bridge piece 12 by a length of twine or cord 27 whereby the combination trigger arm 22 and leg 23 therefor will not float away after the fall and harpoons therefor descend upon the game.

It is obviously apparent that the present invention may be applied equally and effectually as well upon the ground as a box trap or which may be suspended over the edges of cliffs adjacent the entrances of inaccessible caves and the like to capture the more wary animals.

The invention is susceptible of various changes in its form, proportions and minor details of construction, and the right is herein reserved to make such changes as properly fall within the scope of the appended claim.

Having described the invention, what is claimed is:—

A trap construction comprising a housing having standards arranged adjacent the entrance thereof and extended for appreciable distances thereabove, a bridge piece establishing connection at its ends between the uppermost projecting ends of the standards, flange members connected terminally thereof with the housing and bridge piece and defining guide passages throughout the major portions of their lengths by the spacing of the standards therefrom, a fall of sectional formation having inner and outer sections, the inner section having its extended portions slidably mounted within the passageways, a multiplicity of harpoons, the outer section of the fall maintaining the shanks of the harpoons against the adjacent portions of the longer section of the fall, and a trigger mechanism for the completed fall.

In testimony whereof I affix my signature.

WILL ANDERSON.